Nov. 9, 1937. C. L. PAULUS 2,098,755
TRANSMISSION BELT AND JOINT THEREFOR
Filed June 25, 1936 2 Sheets-Sheet 1
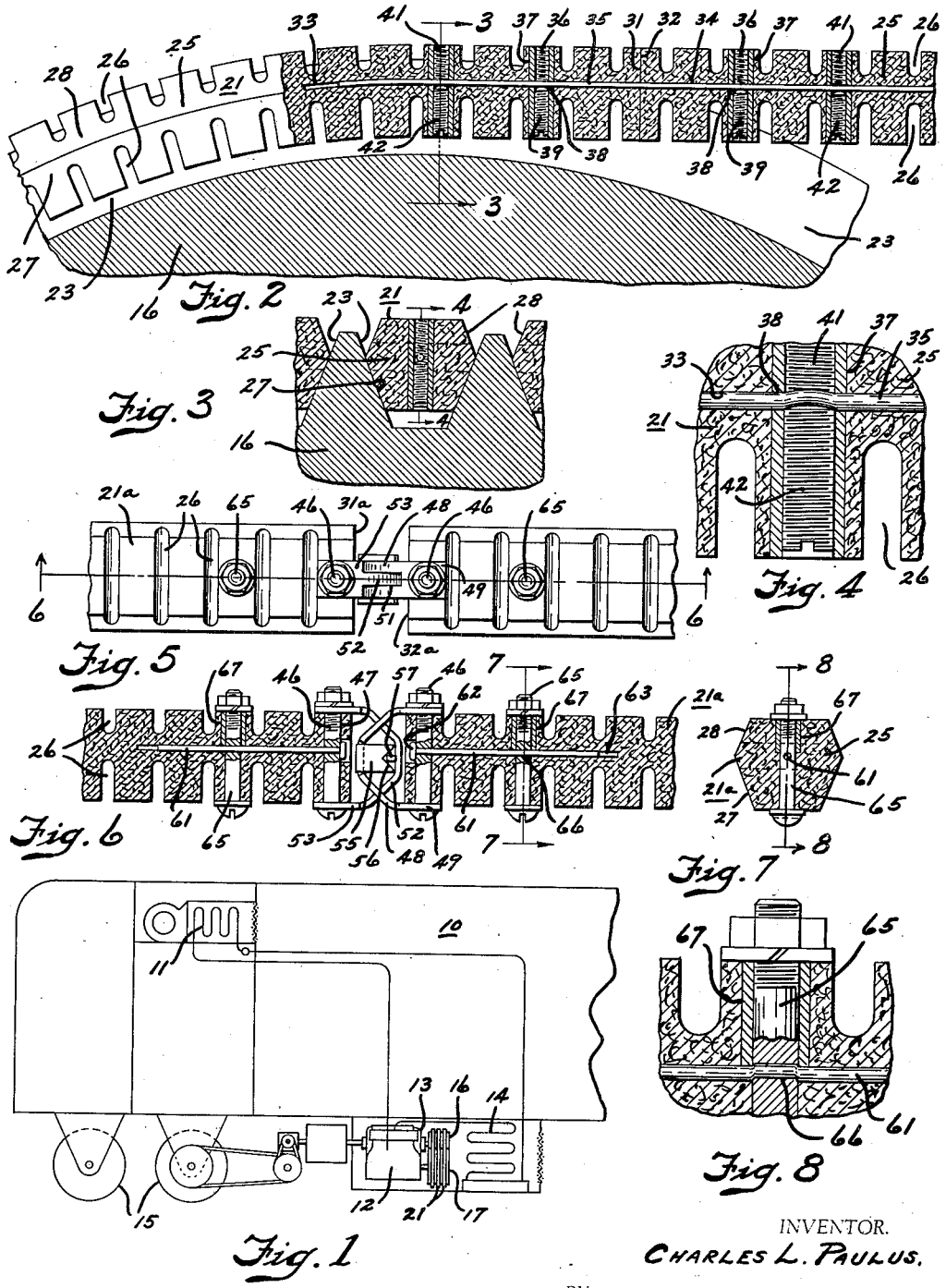
INVENTOR.
CHARLES L. PAULUS.
BY
Spencer, Hardman and Fehr.
HIS ATTORNEYS.

Nov. 9, 1937.   C. L. PAULUS   2,098,755
TRANSMISSION BELT AND JOINT THEREFOR
Filed June 25, 1936   2 Sheets—Sheet 2

INVENTOR.
CHARLES L. PAULUS.
BY Spencer, Hardman and Fehr.
HIS ATTORNEYS.

Patented Nov. 9, 1937

2,098,755

UNITED STATES PATENT OFFICE 2,098,755

TRANSMISSION BELT AND JOINT THEREFOR

Charles L. Paulus, Dayton, Ohio, assignor to General Motors Corporation, Dayton, Ohio, a corporation of Delaware Application June 25, 1936, Serial No. 87,264

8 Claims. (Cl. 24—31)

This invention relates to refrigeration and particularly to driving connections between an element of a refrigerating system to be driven and a driving element.

One of the objects of the present invention is to provide an improved connecting structure between the ends of a strip of belting material to form a continuous or substantially endless belt.

Another object of the present invention is to provide an improved connection between the ends of belting material employed to form a substantially endless band which connection will increase the tensil strength of the band near the end portions thereof above that at points remote from the ends without stiffening the belt so as to prolong its life.

A further object of the invention is to provide a connection between the ends of a belt which connection will distribute forces applied to the belt between the end portions thereof and points remote from the end portions to prevent damage to or breakage of the substantially endless belt at the ends thereof.

In carrying out the foregoing objects it is a still further and more specific object of the invention to provide a connection between the ends of a belt, particularly a belt of V shape in cross-section, which connection will have its fastening portions or members disposed in vertical alignment with the axis of rotation of the belt about a pulley to thus prevent abnormal deformation of the belt during operations thereof.

Further objects and advantages of the present invention will be apparent from the following description, reference being had to the accompanying drawings, wherein a preferred form of the present invention is clearly shown.

In the drawings:

Fig. 1 is a diagrammatic showing of a refrigerating system installed in or on a vehicle and having my invention embodied therein;

Fig. 2 is a fragmentary view showing a belt, partly in section and partly in elevation, mounted upon a pulley and having the ends thereof connected together in accordance with my invention;

Fig. 3 is a vertical sectional view of the belt and pulley disclosed in Fig. 2 and taken on the line 3—3 thereof;

Fig. 4 is an enlarged fragmentary sectional view of the belt disclosed in Fig. 2 and is taken on the line 4—4 of Fig. 3;

Fig. 5 is a top plan view of a portion of a belt showing a modified connecting construction between the ends thereof;

Fig. 6 is a vertical sectional view of the belt disclosed in Fig. 5 and is taken on the line 6—6 thereof;

Fig. 7 is a sectional view taken on the line 7—7 of Fig. 6;

Fig. 8 is an enlarged fragmentary sectional view taken on the line 8—8 of Fig. 7.

Figure 9:
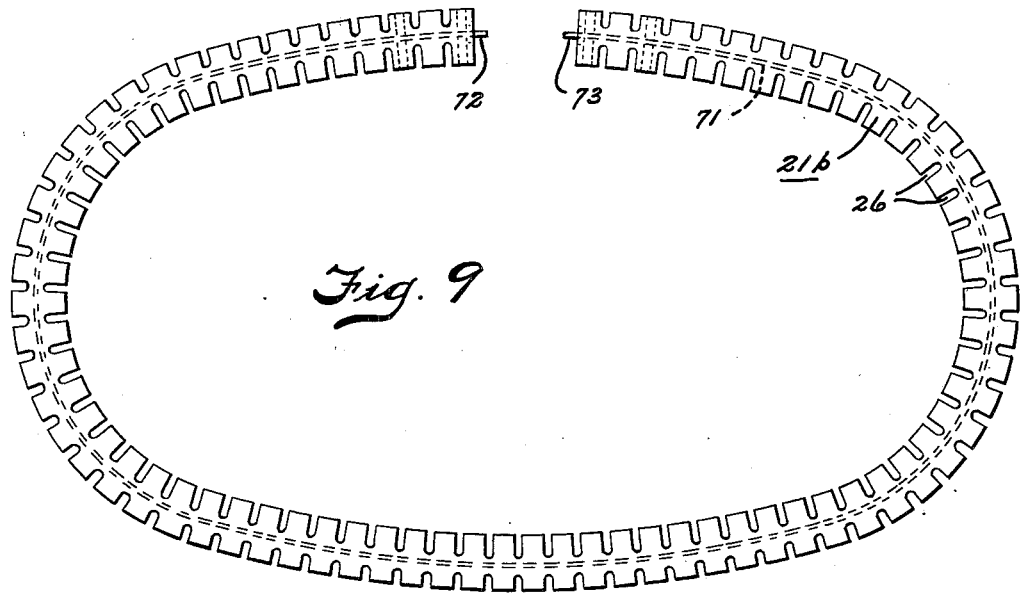
Fig. 9 is a view of a modified form of belt having a wire disposed therein and extending throughout the length thereof.

Referring to the drawings, for illustrating the present invention, I have shown in Fig. 1 thereof a railway car generally represented by the reference character 10 and having a compartment or compartments therein adapted to be cooled. The car 10 has a closed refrigerating system associated therewith and the system includes a cooling element or evaporator 11, mounted in the compartment of the car to be cooled, a compressor 12, a motor 13 and a condenser 14. The evaporator 11, compressor 12 and condenser 14 are all connected together by suitable conduits for circulating a refrigerating medium therebetween to cause the cooling element 11 to produce a refrigerating effect in a manner well known to those skilled in the art. The compressor 12, motor 13 and condenser 14 are mounted beneath the car 10 in any suitable and well-known manner and may be cooled by air during travel of the car. The motor 13 may be driven from wheels 15 of car 10 by suitable connections or provisions may be made for operating the motor electrically as is common practice in the art. In either event motor 13, which is the drive element for the driven member or compressor 12, is provided with a pulley 16 which has three grooves formed in its peripheral edge. A pulley 17 similar in construction to the motor pulley 16 is mounted on the crank-shaft of compressor 12 and these pulleys 16 and 17 are operatively connected together by a plurality of belts 21 so that operation of motor 13 drives compressor 12 to circulate the refrigerating medium throughout the closed refrigerating system. Since my invention relates to the driving connection between the compressor 12 and motor 13 a more detailed description of the car 10 and the closed refrigerating system associated therewith is believed unnecessary.

The driving connection between compressor 12 and motor 13 is preferably of the type wherein the motor and compressor pulleys 16 and 17 have a plurality of substantially V-shaped grooves 23 cut or formed in their cylindrical peripheral edge (see Fig. 3). The grooves 23 are adapted to receive belts 21 which engage the side walls of the grooves and which are spaced from the bottom walls thereof for operatively connecting the one pulley 16 with the other pulley 17. Such a driving connection is ordinarily referred to as a V-belt drive and my invention is particularly adapted to this type of driving connection. Each of the belts 21 are of the common rubber and fabric composition molded material ordinarily provided with a central longitudinally extending horizontal web portion 25 usually formed of a plurality of long tough fabric cords or the like embedded in and having a layer of rubber on each side thereof. On each side of the web portion 25 there are provided in the layers of rubber a plurality of spaced apart grooves 26 extending transversely to the length of the belt 21 and these grooves 26 while aiding in keeping belt 21 cool also permit bending or flexing of the belt about a central axis such as occurs when the belt is mounted upon the pulleys 16 and 17. Each belt 21 has angled side walls 27 which engage the side walls of the V-shaped grooves 23 provided in the pulleys 16 and 17. The walls 28 of belt 21 extending upwardly from the walls 27 are disposed at an angle opposite the angled extension of walls 27 for purposes of facilitating production of the belts and for increasing the flexibility thereof.

I have found that certain of ordinary fastening means employed to connect the ends of belts, of the type disclosed to provide a substantially endless band, decrease the life of the belts due to their causing the immediate end portions of the belts to become weakened or torn after short periods of operation. My invention is therefore directed to a connection for the ends of such belts which will increase the life of the belts so as to obtain maximum service therefrom. In Fig. 2 of the drawings of the present disclosure the belt 21 has its ends 31 and 32 abutting one another and these ends are connected together to form a substantially endless band by a connecting structure to now be described. It will be noted that openings 33 and 34 extend inwardly from each end 31 and 32 respectively of belt 21 in the central web portion 25 thereof and that a metallic wire member 35 is disposed in the openings. The openings 33 and 34 may be formed in the belt 21 during molding thereof or these openings may be cut or drilled therein after the belt has been molded. Metal inserts 36 placed in openings 37, cut or formed in belt 21 prior to insertion of wire 35 into openings 33 and 34, are provided with openings 38 through which the wire 35 extends. The metal inserts 36 extend transversely to the longitudinal extension of belt 21 through the central web portion 25 thereof near each end 31 and 32. A screw 39 is threaded into the metal inserts 36 and the ends of screws 39 tightly engage wire 35 to deform same within the hollow inserts (see Fig. 4) so as to prevent movement of the wire 35 within belt 21 relative to the inserts to thereby hold the ends 31 and 32 of belt 21 together to form a substantially endless band. The wire 35 is preferably of the so-called music wire type having extremely high tensil strength. A relatively small diameter wire of this material will be highly flexible and will equal the strength of a fabric and rubber composition belt of the type described.

In order to distribute the tensil force applied to belt 21 to points remote from the ends 31 and 32 and from the inserts 36 located near these ends I place in belt 21 a pair of metal inserts 41 similar in construction and form to the inserts 36. It will be noted that each of the pair of inserts 41 are spaced from each of the metal inserts 36 and that screw 42 threaded into the inserts 41 also clamps against wire 35 to deform the wire within insert 41 in the same manner as described relative to the clamping of screws 39 within inserts 36 against wire 35 (see Fig. 4). Thus wire 35 is secured within and attached to belt 21 at a plurality of spaced apart points inwardly of the ends 31 and 32 thereof to distribute the forces of a load placed upon the belt through the inserts 36 and 41 to parts of the belt remote from its ends. By extending the wire 35 beyond the metal inserts 41 bending forces imparted to the belt during its passage over pulleys is also distributed beyond the elements comprising the belt end connecting construction and this feature tends to prolong the life of the belt. The elastic limit of wire 35 is far greater than any section of belt 21 and it will withstand considerable twisting or bending so as not to reduce or impair the flexibility of belt 21 at the end connecting construction. It will be seen therefore that my invention permits the construction of substantially endless belts from strips of belting material and that the tensil or pull force applied to belt 21 will be transmitted to a plurality of points remote from the connected ends thereof. My improved belt end connecting structure provides a belt wherein the portions thereof near its ends are substantially equal to the other sections thereof and wherein the immediate end portions of the belt are not weakened by connecting means therefor. Thus my improved belt end connecting structure prolongs the life of the belt so as to obtain maximum service therefrom.

Referring now to Figs. 5 to 8 inclusive of the drawings wherein I have shown a modified belt end connecting construction it will be noted that the ends 31a and 32a of belt 21a are spaced from one another and connected by a metallic connecting device to now be described. Bolts or studs 46 pass through belt 21a through holes 47 extending transversely to the central longitudinal web portion 25 of belt 21a near the ends 31a and 32a. A yoke member 48 having its ends 49 secured to bolts 46 is provided with a slot 51 (see Fig. 5) through which a narrow portion 52 provided on a second yoke member 53, having its ends secured to the opposite bolt 46, extends. A small substantially U-shaped metal member 55 provided with forked ends 56 is interposed between the yoke members 48 and 53 (see Fig. 6). The forked ends 56 of member 55 engage a straight metal piece 57 which abuts against the narrowed portion 52 of yoke 53. It is to be understood that the members 55 and 57 are inserted between the yoke members 48 and 53, after these members have been assembled to belt 21 in overlapping or interlocking relation as disclosed in the drawings to provide a locked connection between the ends 31a and 32a of belt 21a so as to provide a substantially endless band.

In order to distribute the tensil or pull force applied to belt 21a to portions thereof remote from its ends 31a and 32a I insert a wire 61, having a head 62 formed thereon, within an opening 63 provided in the central web portion 25 of belt 21a. The wire 61 passes through an opening provided in a stud or bolt 46 at end 32a of belt 21a and has a portion thereof intermediate its ends clamped to belt 21a in a manner to now be described. A stud or bolt 65 similar to and extending parallel with the stud or bolt 46 at the end 32a of belt 21a passes through an opening provided in the belt and this stud or bolt is provided with an opening 66 through which wire 61 extends. A collar or clamping member 67 surrounds bolt 65 on one side of wire 61 and is adapted to be forced, by tightening of the nut on bolt 65, against the wire 61 to slightly deform the wire (see Fig. 8) so as to clamp same firmly between the bolts 46 and 65 within belt 21a. A construction similar to that just described as being mounted in the one end portion of belt 21a is also incorporated in the other end portion 31a of the belt. While the connecting construction described includes members passing through the belt 21a at its ends 31a and 32a it is obvious that, with the use of the additional bolts 65 and their rigid connection with bolts 46, the tensil or pull force applied to belt 21a will be distributed to a point or points remote from the end portions thereof to thus prevent damage by clamping means at these ends to thereby prolong the life of the belt.

In illustrating the present invention I have shown the wire elements 35 and 61 as extending through that portion only of the belts 21 and 21a adjacent the ends thereof but it is to be understood that my invention also contemplates the extension of a wire element within and entirely around the belts. As before stated belts of the type disclosed ordinarily have large tough fabrics or cords extending longitudinally within and molded in the central portion of the belts. A small opening can therefore be molded within the belt adjacent these fabrics or cords for reception of a wire for increasing the tensil strength of the belt by extending the wire continuously around the belt. It is known that a wire or other metallic member placed in or molded within rubber will cause deterioration of the rubber by certain chemical reactions that take place between the rubber and metal. By providing an opening in the central part of a belt adjacent the fabric cords these cloth cords contact the metal instead of the metal contacting the rubber. Therefore the chemical reaction between metal inserts and rubber of a composition rubber and fabric belt is reduced or eliminated and the belt is not weakened by deterioration of the rubber which breaks down the carcass of the belt. Thus the belts of the present invention having the wire members inserted therein will not be subject to rapid deterioration and will be of longer life.

Figure 10:
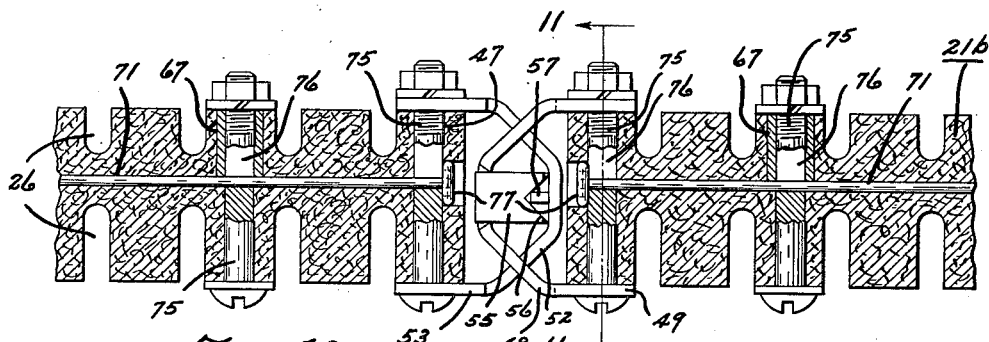
Fig. 10 is a sectional view similar to Fig. 6 showing the connection of the ends of a belt of the type disclosed in Fig. 9.
Figure 11:
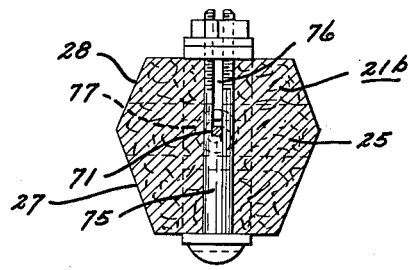
Fig. 11 is an enlarged sectional view taken on the line 11—11 of Fig. 10 showing one form of attaching the wire of the belt disclosed in Figs. 9 and 10 to the belt end connecting means.

Referring now to Fig. 9 wherein I have disclosed a length of belt 21b it will be understood that the one-piece length of wire 71 therein and extending continuously from one end to the other end of the belt is preferably disposed or molded in the belt adjacent the central fabrics or cords thereof. The belt length 21b preferably has loose ends with the ends 72 and 73 of wire 71 extending outwardly therefrom so as to be capable of forming an endless band over pulleys spaced apart at varying distances relative to one another. The belt 21b may therefore be cut to any desired length and its ends connected in accordance with my invention to provide a properly fitted endless band between two or more pulleys. In Fig. 10 I have disclosed ends of belt 21b as being connected with the connecting construction illustrated in Figs. 5 to 8 inclusive but it will be noted that I have provided a modified form of bolt 75, corresponding to and disposed in the position of bolts 46 and 65 in the construction shown in Fig. 6, for the reception of wire 71. The bolts 75 in the structure disclosed in Figs. 10 and 11 each have a slot 76 cut therein for receiving wire 71. In cutting the belt 21b to a desired length and fitting same over pulleys by the end connecting construction the bolts 75 are pushed through the belt with walls of slot 76 straddling wire 71. The ends 72 and 73 of belt 21b are each then bent or deformed to provide enlarged end or head portions 77 which engage the end bolts 75 and prevent movement of wire 71 relative to the bolts. The collars 67 disposed over bolts 75, positioned remote from the end bolts, clamp against wire 71 to further prevent movement of wire 71 relative to bolts 75 and to the belt 21b. This wire 71 is locked in position within belt 21b and between the ends thereof. The novel connecting construction for the ends of belt 21b causes force applied to the connection to be distributed to portions of the belt remote from its ends and over substantially all portions of the belt throughout its length. By extending the wire 71 throughout the length of belt 21b as disclosed in Figs. 9 to 11 inclusive all portions of the endless band will be of substantially equal tensil strength and stretching of the band will be materially retarded or prevented.

In describing the present invention in connection with composition rubber and fabric belts of the type having molded or embedded therein plies of cords or fabrics it is well-known in the art that such belts have a certain ply or plies of strong tough fabric which forms what is commonly termed the neutral axis of the belt. This so-called neutral axis of a belt of the type referred to can, during manufacture of the belt, be located at any desired point within the belt. This neutral axis of a belt is the definition for that portion between the top and bottom of a belt which, when the belt is rotated about an axis such as the axis of a pulley, it is not stretched and thereby causes stretching of other portions of the belt adjacent its neutral axis. Obviously therefore it is desirable and preferable to locate the wire members 35 and 61 disclosed in this application along the neutral axis of the belts 21 and 21a so that the same will not be subjected to abnormal stretching. It is highly important to the principle of the present invention to make the wire members 35 and 61 small and to dispose these members within belts 21 and 21a in the central portion of web 25, which portion of belts 21 and 21a is the so-called neutral axis thereof, so as to prevent stiffening of the belt while at the same time not impairing the original flexibility of a belt by insertion therein of wire members as disclosed.

From the foregoing it will be seen that I have provided an improved belt end connecting construction for belts made from strips of belting material. My improved construction for connecting the ends of belts together provides a belt which is stronger than belts having their ends connected by conventional connectors and yet no stiffer than if the belt was formed integral or continuous throughout its entire extension. My invention prolongs the life of belts by providing a construction that will not cause damage to the immediate end portions thereof. The improved belt end connecting construction of the present invention permits a belt to be properly fitted between two or more pulley members, while at the same time eliminating the necessity of carrying a supply of continuous or integral belts of various lengths relative to one another for each different installation to be made.

While the forms of embodiments of the invention as herein disclosed, constitute preferred forms, it is to be understood that other forms might be adopted, all coming within the scope of the claims which follow.

What is claimed is as follows:

1. In combination, a belt having its ends connected together to form a substantially endless band, a metal wire member extending longitudinally within the belt inwardly of the ends thereof, means for securing portions of the belt adjacent the ends thereof to said wire member for connecting the ends of the belt together, means attached to the belt and engaging other portions of said wire member beyond said secured portions of the belt thereto, and said last named means being located near the ends of said belt and spaced from the point of security of the belt to the wire member adjacent the belt ends.

2. In combination, a belt having its ends connected together to form a substantially endless band, a metal wire member extending longitudinally within the belt inwardly of the ends thereof, means for securing portions of the belt adjacent the ends thereof to said wire member for connecting the ends of the belt together, means passing through and attached to the belt for rigidly clamping other portions of said wire member to the belt beyond said secured portions of the belt to the wire member, and said last named means being located near the ends of said belt and spaced from the point of security of the belt to the wire member adjacent the belt ends.

3. In combination, a belt having its ends connected together to form a substantially endless band, a metal wire member extending longitudinally within the belt inwardly of the ends thereof, means for securing portions of the belt adjacent the ends thereof to said wire member for connecting the ends of the belt together, means attached to the belt and engaging other portions of said wire member beyond said secured portions of the belt thereto, said last named means being located near the ends of said belt and spaced from the point of security of the belt to the wire member adjacent the belt ends, and said wire member being extended inwardly of the ends of the belt substantially beyond said last named means.

4. In combination, a belt having its ends connected together to form a substantially endless band, a metal wire member extending longitudinally within the belt inwardly of the ends thereof, means for securing portions of the belt adjacent the ends thereof to said wire member for connecting the ends of the belt together, means passing through and attached to the belt for rigidly clamping other portions of said wire member to the belt beyond said secured portions of the belt to the wire member, said last named means being located near the ends of said belt and spaced from the point of security of the belt to the wire member adjacent the belt ends, and said wire member being extended inwardly of the ends of the belt substantially beyond said last named means.

5. In combination, a belt having its ends connected together to form a substantially endless band, means attached to the belt adjacent the ends thereof for connecting said ends together, said connecting means including a portion extending inwardly of the ends of said belt beyond the point of attachment thereof to the belt, means attached to the belt and engaging said extending portion of said connecting means for securing same to the belt inwardly of the ends thereof, and said last named means being located near the ends of said belt and spaced from the point of security of the belt end connecting means to the belt.

6. In combination, a belt having its ends connected together to form a substantially endless band, means attached to the belt adjacent the ends thereof for connecting said ends together, said connecting means including a portion extending inwardly of the ends of said belt beyond the point of attachment thereof to the belt, means passing through and attached to the belt for rigidly clamping said extending portion of said connecting means to the belt inwardly of the ends thereof, and said last named means being located near the ends of said belt and spaced from the point of security of the belt end connecting means to the belt.

7. In combination, a belt having its ends connected together to form a substantially endless band, means attached to the belt adjacent the ends thereof for connecting said ends together, said connecting means including a portion extending inwardly of the ends of said belt beyond the point of attachment thereof to the belt, means attached to the belt and engaging said extending portion of said connecting means for securing same to the belt inwardly of the ends thereof, said last named means being located near the ends of said belt and spaced from the point of security of the belt end connecting means to the belt, and a portion of said belt end connecting means being extended inwardly of the ends of the belt substantially beyond the means for securing said extending portion thereof to the belt.

8. In combination, a belt having its ends connected together to form a substantially endless band, means attached to the belt adjacent the ends thereof for connecting said ends together, said connecting means including a portion extending inwardly of the ends of said belt beyond the point of attachment thereof to the belt, means passing through and attached to the belt for rigidly clamping said extending portion of said connecting means to the belt inwardly of the ends thereof, said last named means being located near the ends of said belt and spaced from the point of security of the belt end connecting means to the belt, and a portion of said belt end connecting means being extended inwardly of the ends of the belt substantially beyond the means for securing said extending portion thereof to the belt.

CHARLES L. PAULUS.